US009195715B1

(12) United States Patent
Ngo et al.

(10) Patent No.: US 9,195,715 B1
(45) Date of Patent: *Nov. 24, 2015

(54) PROVIDING INFORMATION REGARDING PRIOR SEARCHES

(71) Applicant: Google Inc., Mountain View, CA (US)

(72) Inventors: Brian L. Ngo, San Francisco, CA (US); Nicholas G. Fey, Mountain View, CA (US); Junichi Uekawa, Tokyo (JP); Noritaka Adachi, Tokyo (JP)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/326,843

(22) Filed: Jul. 9, 2014

Related U.S. Application Data

(63) Continuation of application No. 13/350,104, filed on Jan. 13, 2012, now Pat. No. 8,805,828.

(51) Int. Cl.
*G06F 7/00* (2006.01)
*G06F 17/30* (2006.01)

(52) U.S. Cl.
CPC ................. *G06F 17/30528* (2013.01)

(58) Field of Classification Search
CPC ....... H04W 64/00; H04W 4/023; H04W 4/02; G06F 17/30241; G01C 21/3679
USPC ........................................................ 707/724
See application file for complete search history.

(56) References Cited

U.S. PATENT DOCUMENTS

| 6,321,228 | B1* | 11/2001 | Crandall | G06F 17/30864 |
| 8,478,773 | B1* | 7/2013 | Bryukhov | G06F 17/30693 |
| | | | | 705/14.49 |
| 2006/0248081 | A1* | 11/2006 | Lamy | G01J 3/46 |
| 2007/0005575 | A1* | 1/2007 | Dai | G06F 17/30867 |
| 2008/0307461 | A1* | 12/2008 | Tanikawa | H04N 5/44543 |
| | | | | 725/53 |
| 2009/0089311 | A1* | 4/2009 | Chi | G06F 17/30867 |
| 2009/0287658 | A1* | 11/2009 | Bennett | G06F 17/30864 |
| 2011/0320441 | A1* | 12/2011 | Lee | G06F 17/30867 |
| | | | | 707/723 |
| 2011/0320464 | A1* | 12/2011 | Okato | G10L 15/1815 |
| | | | | 707/751 |
| 2012/0197722 | A1* | 8/2012 | Mesaros | G06Q 30/06 |
| | | | | 705/14.58 |
| 2013/0036381 | A1* | 2/2013 | Joshi | G06F 17/30867 |
| | | | | 715/808 |
| 2013/0097162 | A1* | 4/2013 | Corcoran | G06F 17/30241 |
| | | | | 707/724 |

OTHER PUBLICATIONS

Google Inc., "Web History", https://accounts.google.com/ServiceLoginAuth?continue=https, print date Nov. 26, 2011, 1 page.
Google Inc., "Google My Search History", www.blogoscooped.com/archivei2005-04-20-n63.html, print date Nov. 26, 2011, pp. 1-3.

(Continued)

*Primary Examiner* — Binh V Ho
(74) *Attorney, Agent, or Firm* — Fish & Richardson P.C.

(57) ABSTRACT

A system is configured to identify prior search history associated with a user, where the prior search history includes information regarding searches initiated by the user and information regarding search results provided based on the searches. The system is further configured to filter the prior search history to select one of the search results, generate an information item for the search result, and provide the information item to a client, associated with the user, for presentation on a display associated with the client.

20 Claims, 11 Drawing Sheets

(56) References Cited

OTHER PUBLICATIONS

Office Action issued in U.S. Appl. No. 13/350,104 on Dec. 19, 2013, 27 pages.

Notice of Allowance issued in U.S. Appl. No. 13/350,104, on May 21, 2014, 9 pages.

* cited by examiner

| USER IDENTIFIER FIELD | SEARCH HISTORY FIELD |
|---|---|
| USER ID 1 | SEARCH HISTORY 1 |
| USER ID 2 | SEARCH HISTORY 2 |
| USER ID 3 | SEARCH HISTORY 3 |
| ... | ... |
| USER ID Z | SEARCH HISTORY Z |

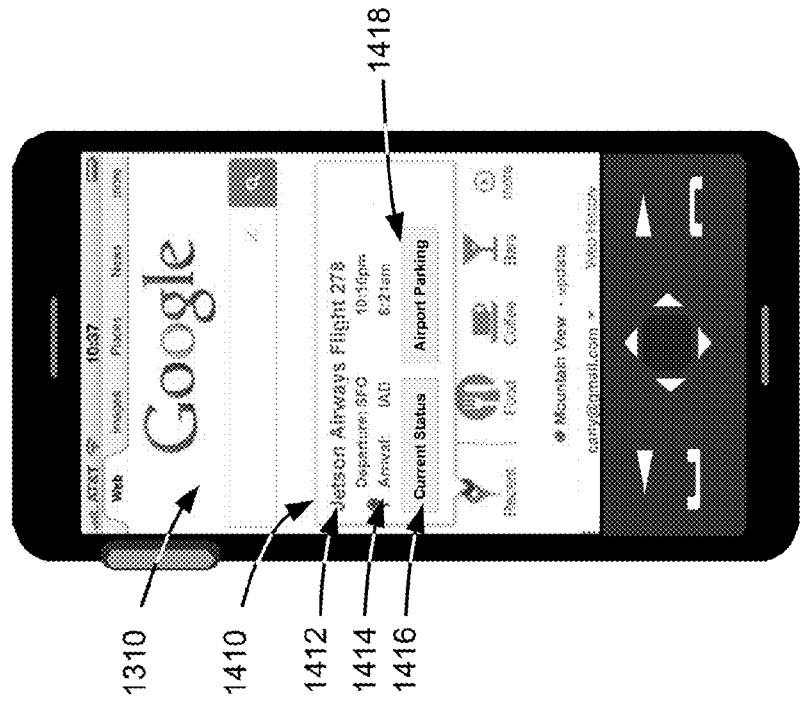
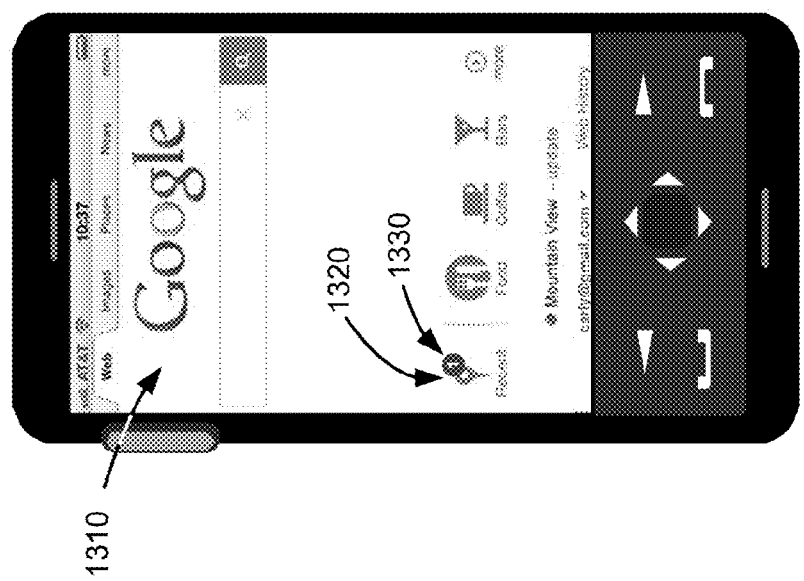
FIG. 14
FIG. 13

PROVIDING INFORMATION REGARDING PRIOR SEARCHES

CROSS-REFERENCE TO RELATED APPLICATION

This application is a continuation of U.S. application Ser. No. 13/350,104, filed Jan. 13, 2012, the contents of which is incorporated by reference

BACKGROUND

Many techniques are available to users today to find information on the World Wide Web ("web"). For example, users often use web browsers and/or search engines to find information of interest. Search engines provide search results in response to a search query from a user. The search results are often presented in a ranked list, based on the search query from the user.

Users often use different types of devices to initiate searches. For example, a user might initiate a search using a desktop computer, another search using a tablet computer, and yet another search using a mobile telephone. To obtain information regarding a search initiated by one device on another device, the user recreates the search on the other device.

SUMMARY

According to one possible implementation, a method, performed by one or more server devices, may include receiving, from a user, a request for a particular web page; and identifying prior search history associated with the user, where the prior search history may include information regarding searches initiated by the user prior to the request being received and information regarding search results provided based on the searches. The method may also include filtering the prior search history, using one or more contextual signals, to select one of the search results; generating an information item for the one of the search results; generating a user interface associated with the web page, where the user interface may include a selectable object via which the information item is available; providing the user interface to a client associated with the user; and providing the information item to the client, where the information item may be presented on a display associated with the client when the selectable object, included in the user interface, is selected.

According to another possible implementation, a system may include one or more server devices. The one or more server devices may identify prior search history associated with a user, where the prior search history may include information regarding searches initiated by the user and information regarding search results provided based on the searches; filter the prior search history, using one or more contextual signals, to select one of the search results; generate an information item for the one of the search results; and provide the information item to a client associated with the user. The one or more server devices may also receive, from the client associated with the user, a request for a particular web page; generate a user interface associated with the particular web page, where the user interface includes a selectable object via which the information item is available; and provide the user interface to the client associated with the user, where the information item may be presented on a display associated with the client when the selectable object, included in the user interface, is selected.

According to a further possible implementation, a computer-readable medium may include instructions which, when executed by one or more processors, may cause the one or more processors to identify prior search history associated with a user, where the prior search history may include information regarding searches initiated by the user and information regarding search results provided based on the searches; and filter the prior search history using a number of contextual signals to select one of the search results. The contextual signals may include two or more of: information regarding a position of the one of the search results in a list of search results, information regarding a time associated with the one of the search results, information regarding a score of the one of the search results, information regarding a category associated with the one of the search results, information regarding whether a selection occurred in relation to the one of the search results, information regarding an amount of time spent accessing a document associated with the one of the search results, information regarding an amount of time spent accessing a list of search results that includes the one of the search results, information regarding a quantity of times that a search query, for which the one of the search results was identified as relevant, was submitted by the user, information regarding whether a same search query, for which the one of the search results was identified as relevant, has been submitted via different devices of the user, information regarding whether the user selected the one of the search results using different devices of the user, or information regarding a geographic location associated with the one of the search results. The computer-readable medium may further include instructions which, when executed by one or more processors, may cause the one or more processors to generate an information item for the one of the search results; and provide the information item to a client, associated with the user, for presentation on a display associated with the client.

BRIEF DESCRIPTION OF THE DRAWINGS

The accompanying drawings, which are incorporated in and constitute a part of this specification, illustrate one or more embodiments described herein and, together with the description, explain these embodiments. In the drawings:

FIG. 5 is a diagram of an example data structure that may be stored in a user profile of FIG. 4;

FIGS. 13 and 14 are diagrams illustrating various aspects of an example for providing information regarding a prior web search.

DETAILED DESCRIPTION

The following detailed description refers to the accompanying drawings. The same reference numbers in different drawings may identify the same or similar elements.

A system and/or method, as described herein, may determine information regarding a user's search history with the user's permission, and provide information regarding one or more objects relating to the search history for later use by the user. An object, as used herein, is to be broadly interpreted to refer to anything that can be the subject of a search. For example, an object may refer to a person, a business, a product, a web page, a service, a location, a weather forecast, a stock quote, a status of a flight, or the like.

Figure 1:
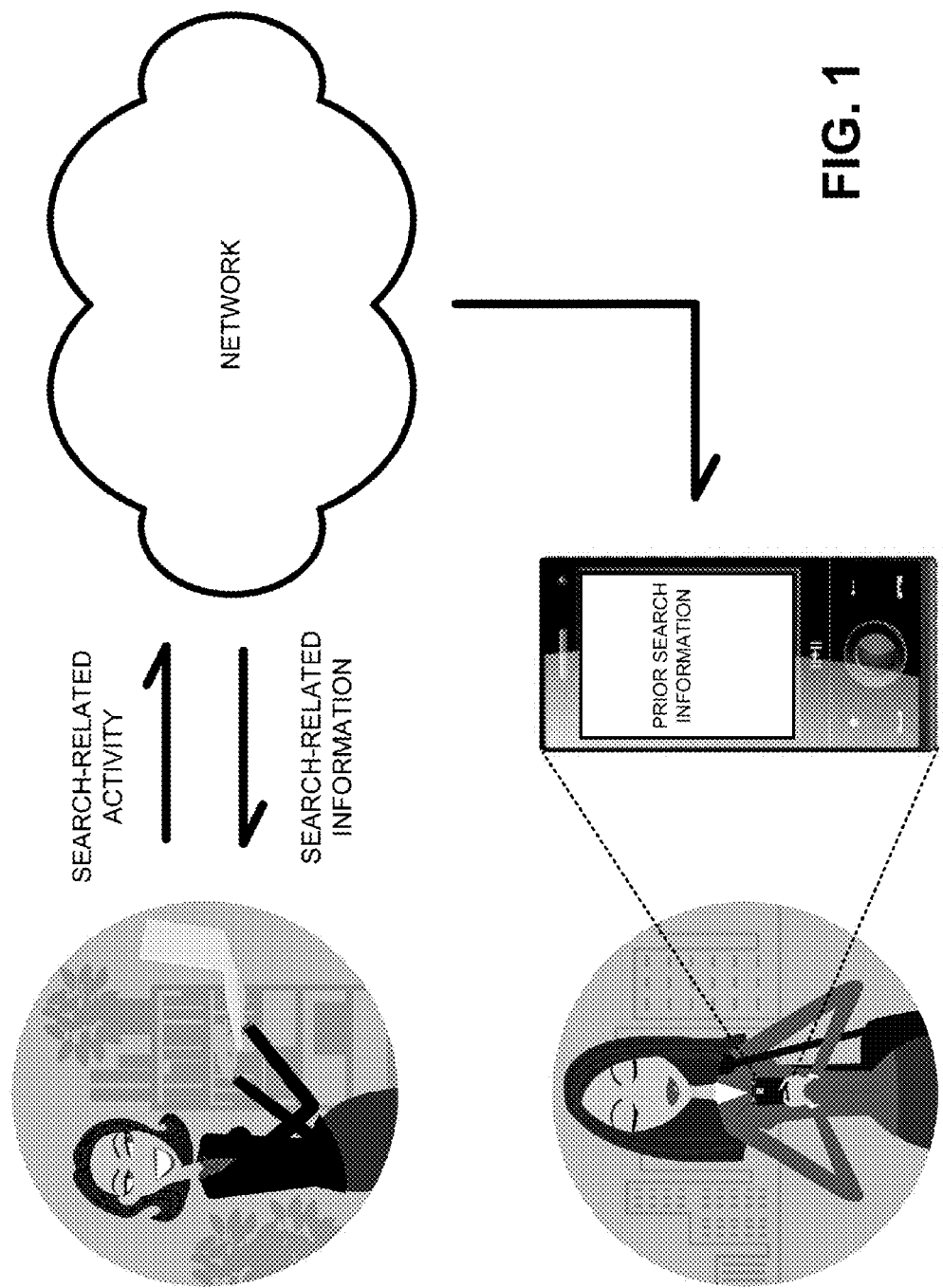
FIG. 1 is a diagram illustrating an overview of an example implementation described herein.

FIG. 1 is a diagram illustrating an overview of an example implementation described herein. As shown in FIG. 1, assume that a user uses her laptop computer, at home, to perform various searches. These searches are illustrated as the user performing "search-related activity" and receiving, in response to the search-related activity, "search-related information." The search-related activity may include the submission of search queries to a search engine and the search-related information may include search results that are relevant to the search queries. Alternatively, or additionally, the search-related activity may include the browsing of various web pages and the search-related information may include the presentation of these web pages.

As shown in FIG. 1, assume that, at some later point in time, the user uses her mobile device and that the user desires information regarding one or more objects that were the subject of the user's prior search-related activity. In this case, the user's mobile device may be presented with prior search information, which may include information regarding one or more objects that were the subject of the user's prior search-related activity.

Assume, for the purpose of this example, that the user uses her laptop to initiate a search, on a local search engine, for a Mexican restaurant. The local search engine may provide a list of search results, which may include information regarding Mexican restaurants, to the user. Assume that the user selects one of the search results, relating to Mexican restaurant 123, to obtain additional information regarding Mexican restaurant 123. Information regarding Mexican restaurant 123 may be provided to the user's mobile device. As a result, when the user is later on the go and desires information regarding Mexican restaurant 123, the user can easily obtain this information on her mobile device.

Providing the user with information regarding her prior search-related activity relating to Mexican restaurant 123 may save the user from having to recreate the search that the user performed on her laptop and save the user from having to remember the name of the Mexican restaurant in which the user was previously interested. Also, entering text, via a mobile device, is often more difficult than entering text using a keyboard of a laptop or desktop computer. Further, the network connection speed of the mobile device is typically slower than the network connection speed of a user's home or work computer. Thus, the user's search experience may be improved by providing information, to the user's mobile device, regarding the user's prior search-related activity.

Also, to avoid overwhelming the user with information regarding the user's prior search-related activity, the user may be presented with information regarding a particular prior search-related activity when a certain contextual signal, or a combination of contextual signals, is satisfied. Several different types of contextual signals may be used. For example, the contextual signal may include a time-based signal. In this example, the user may be presented with information regarding a particular search-related activity when an amount of time that has transpired, since the search-related activity occurred, does not satisfy a particular time threshold—e.g., that a search, relating to the particular search-related activity, occurred within the last 24 hours. Alternatively, or additionally, the contextual signal may include a location-based signal. In this example, the user may be presented with information regarding a particular search-related activity when the user's location satisfies a particular threshold distance of a geographic location associated with the search-related activity—e.g., that a geographic location associated with a search result, relating to the particular search-related activity, is within 25 kilometers of the user's current location.

Figure 2:
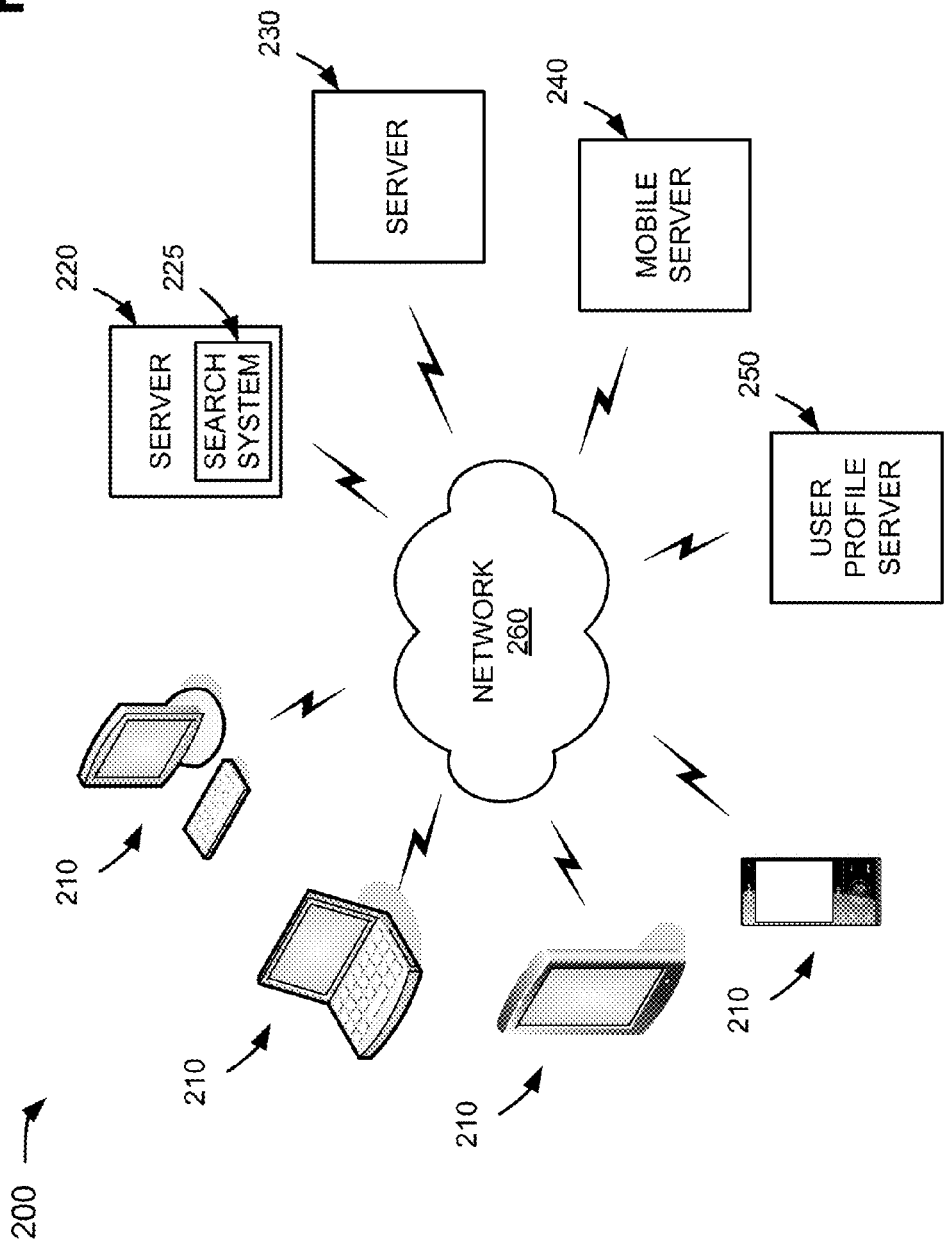
FIG. 2 is a diagram of an example environment in which systems and/or methods described herein may be implemented.

FIG. 2 is a diagram of an example environment 200 in which systems and/or methods described herein may be implemented. Environment 200 may include multiple clients 210 (referred to collectively as "clients 210," and referred to individually as "client 210") connected to multiple servers 220, 230, 240, and 250 via a network 260. Four clients 210 and four servers 220, 230, 240, and 250 have been illustrated as connected to network 260 for simplicity. In practice, there may be additional or fewer clients and/or servers. Also, in some instances, a client may perform a function of a server, and/or a server may perform a function of a client.

Each of clients 210 may include a client device, such as personal computer, a wireless telephone, a personal digital assistant ("PDA"), a laptop, a tablet computer, a work station, or another type of computation or communication device. Clients 210 may include user interfaces presented through one or more browsers (e.g., web browsers, such as CHROME).

Servers 220, 230, 240, and 250 may include server devices that gather, process, and/or search data, and/or implement functions in a manner described herein. Each server 220, 230, 240, or 250 may be implemented as a single server device or a collection of server devices that may be co-located or remotely located. Additionally, or alternatively, any two or more of servers 220, 230, 240, or 250 may be implemented within a single, common server device or a single, common collection of server devices. While servers 220, 230, 240, and 250 are shown as separate components, it may be possible for one or more of servers 220, 230, 240, and/or 250 to perform one or more of the functions of another one or more of servers 220, 230, 240, and/or 250.

As shown in FIG. 2, server 220 may implement a search system 225 that receives search queries from clients 210, and that provides lists of search results that are responsive to the search queries. Server 220 may crawl a corpus of documents (e.g., web documents), index the documents, and store information associated with the documents in a repository of documents. While server 220 is shown as a single server with a single search system 225, in practice, server 220 may correspond to multiple different servers with respective search systems. For example, server 220 may correspond to a web server that implements a web search engine, a local server that implements a local search engine, a product server that implements a product search system, a news server that implements a news search system, an image server that implements an image search system, a video server that implements a video search system, or the like.

Server 230 may store or maintain documents that may be crawled or analyzed by server 220. For example, server 230 may store or maintain web pages, business listings, product information, weather forecasts, flight status, stock information, or the like. In one implementation, server 230, or the information stored or maintained by server 230, may be owned or controlled by an entity that is different than the entity that owns or controls servers 220, 240, and 250.

Server 240 may include a mobile server device that interacts with clients 210 in the form of mobile devices. Server 240 may also interact with servers 220 and 250 to provide information, to clients 210, in a format that is easily presentable on a display of a client 210.

Server 250 may include a user profile server that may determine search history data for users of clients 210. Server 250 may obtain data, concerning a user's search history, from server 220, server 240, and/or client 210. Server 250 may also search and/or process the search history data to determine whether to present information regarding an object, associated with the search history data, to a client 210.

Network 260 may include any type of network, such as a local area network ("LAN"); a wide area network ("WAN"), such as the Internet; a telephone network, such as the Public Switched Telephone Network ("PSTN") or a cellular network; an intranet; a direct connection between devices, or a combination of networks. Clients 210 and servers 220, 230, 240, and 250 may connect to network 260 via wired and/or wireless connections. In other words, any one of client 210, or server 220, 230, 240, or 250 may connect to network 260 via a wired connection, a wireless connection, or a combination of a wired connection and a wireless connection.

Figure 3:
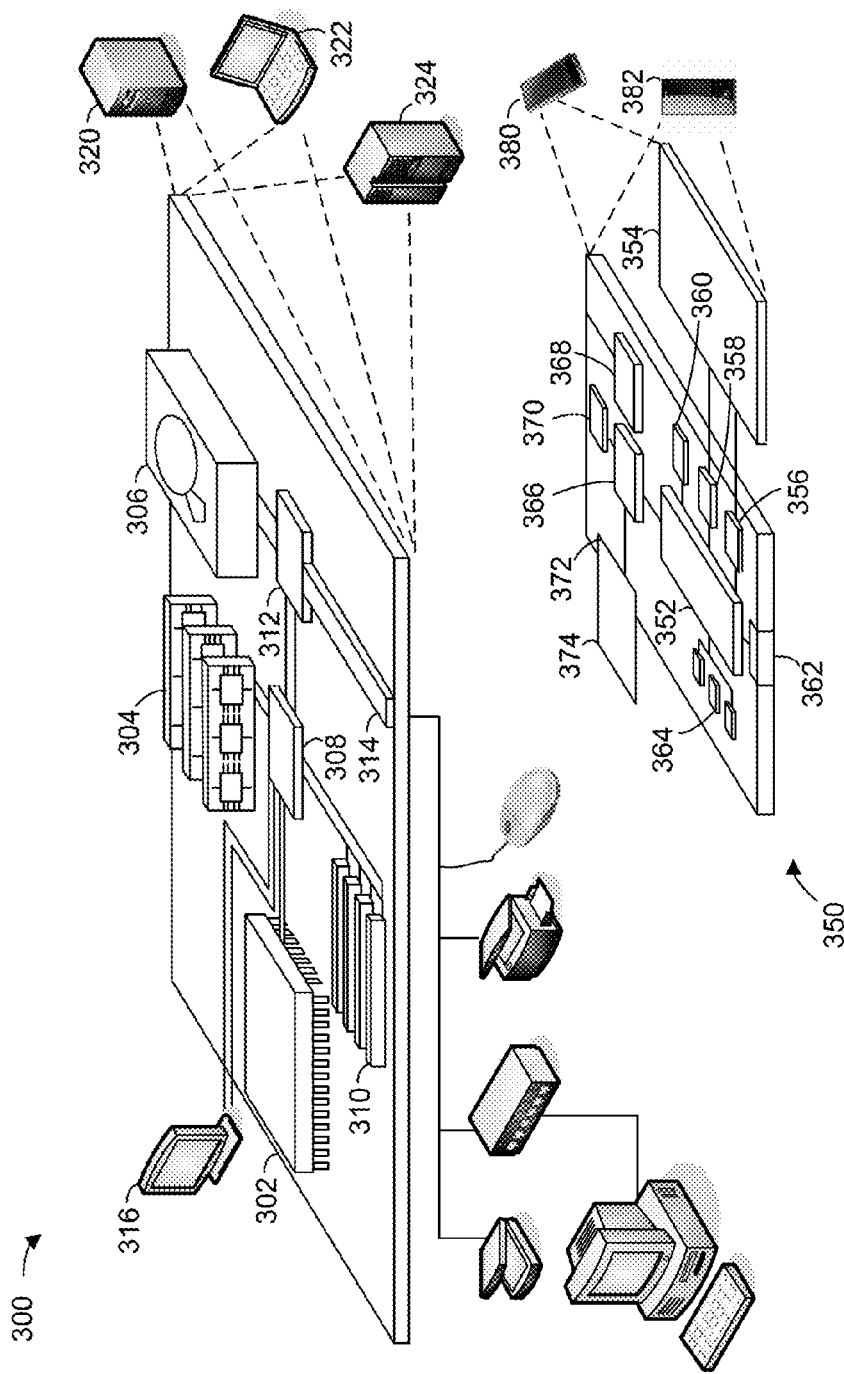
FIG. 3 is a diagram of an example of a generic computer device and a generic mobile computer device.

FIG. 3 is a diagram of an example of a generic computing device 300 and a generic mobile computing device 350, which may be used with the techniques described here. Generic computing device 300 or generic mobile computing device 350 may correspond to, for example, a client 210 and/or a server 220, 230, 240, or 250. Computing device 300 is intended to represent various forms of digital computers, such as laptops, desktops, workstations, personal digital assistants, servers, blade servers, mainframes, and other appropriate computers. Mobile computing device 350 is intended to represent various forms of mobile devices, such as personal digital assistants, cellular telephones, smart phones, tablet computers, and other similar computing devices. The components shown in FIG. 3, their connections and relationships, and their functions, are meant to be examples only, and are not meant to limit implementations described herein.

Computing device 300 may include a processor 302, a memory 304, a storage device 306, a high-speed interface 308 connecting to memory 304 and high-speed expansion ports 310, and a low-speed interface 312 connecting to a low-speed expansion port 314 and a storage device 306. Each of components 302, 304, 306, 308, 310, 312, and 314, are interconnected using various buses, and may be mounted on a common motherboard or in other manners as appropriate. Processor 302 can process instructions for execution within computing device 300, including instructions stored in memory 304 or on storage device 306 to display graphical information for a graphical user interface (GUI) on an external input/output device, such as display 316 coupled to high-speed interface 308. In other implementations, multiple processors and/or multiple buses may be used, as appropriate, along with multiple memories and types of memory. Also, multiple computing devices 300 may be connected, with each device providing portions of the necessary operations, as a server bank, a group of blade servers, or a multi-processor system, etc.

Memory 304 stores information within computing device 300. In one implementation, memory 304 includes a volatile memory unit or units. In another implementation, memory 304 may include a non-volatile memory unit or units. Memory 304 may also be another form of computer-readable medium, such as a magnetic or optical disk. A computer-readable medium may refer to a non-transitory memory device. A memory device may refer to storage space within a single storage device or spread across multiple storage devices.

Storage device 306 is capable of providing mass storage for computing device 300. In one implementation, storage device 306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described herein. The information carrier is a computer or machine-readable medium, such as memory 304, storage device 306, or a memory on processor 302.

High-speed interface 308 manages bandwidth-intensive operations for computing device 300, while low-speed interface 312 manages lower bandwidth-intensive operations. Such allocation of functions is exemplary only. In one implementation, high-speed interface 308 is coupled to memory 304, display 316 (e.g., through a graphics processor or accelerator), and to high-speed expansion ports 310, which may accept various expansion cards (not shown). In this implementation, low-speed interface 312 may be coupled to storage device 306 and low-speed expansion port 314. Low-speed expansion port 314, which may include various communication ports (e.g., USB, Bluetooth, Ethernet, wireless Ethernet, etc.), may be coupled to one or more input/output devices, such as a keyboard, a pointing device, a scanner, or a networking device such as a switch or router, e.g., through a network adapter.

Computing device 300 may be implemented in a number of different forms, as shown in the figure. For example, computing device 300 may be implemented as a standard server 320, or multiple times in a group of such servers. Computing device 300 may also be implemented as part of a rack server system 324. In addition, computing device 300 may be implemented in a personal computer, such as a laptop computer 322. Alternatively, components from computing device 300 may be combined with other components in a mobile device (not shown), such as mobile computing device 350. Each of such devices may contain one or more of computing devices 300, 350, and an entire system may be made up of multiple computing devices 300, 350 communicating with each other.

Mobile computing device 350 may include a processor 352, a memory 364, an input/output ("I/O") device, such as a display 354, a communication interface 366, and a transceiver 368, among other components. Mobile computing device 350 may also be provided with a storage device, such as a microdrive or other device, to provide additional storage. Each of the components 352, 354, 364, 366, and 368 are interconnected using various buses, and several of the components may be mounted on a common motherboard or in other manners as appropriate.

Processor 352 can execute instructions within mobile computing device 350, including instructions stored in memory 364. Processor 352 may be implemented as a chipset of chips that include separate and multiple analog and digital processors. Processor 352 may provide, for example, for coordination of the other components of mobile computing device 350, such as control of user interfaces, applications run by mobile computing device 350, and wireless communication by mobile computing device 350.

Processor 352 may communicate with a user through control interface 358 and display interface 356 coupled to a display 354. Display 354 may be, for example, a TFT LCD (Thin-Film-Transistor Liquid Crystal Display) or an OLED (Organic Light Emitting Diode) display, or other appropriate display technology. Display interface 356 may include appropriate circuitry for driving display 354 to present graphical and other information to a user. Control interface 358 may receive commands from a user and convert the commands for submission to processor 352. In addition, an external interface 362 may be provided in communication with processor 352, so as to enable near area communication of mobile computing device 350 with other devices. External interface 362 may provide, for example, for wired communication in some implementations, or for wireless communication in other implementations, and multiple interfaces may also be used.

Memory 364 stores information within mobile computing device 350. Memory 364 can be implemented as one or more of a computer-readable medium or media, a volatile memory unit or units, or a non-volatile memory unit or units. Expansion memory 374 may also be provided and connected to mobile computing device 350 through expansion interface 372, which may include, for example, a SIMM (Single In Line Memory Module) card interface. Such expansion memory 374 may provide extra storage space for device 350, or may also store applications or other information for mobile computing device 350. Specifically, expansion memory 374 may include instructions to carry out or supplement the processes described herein, and may include secure information also. Thus, for example, expansion memory 374 may be provided as a security module for mobile computing device 350, and may be programmed with instructions that permit secure use of mobile computing device 350. In addition, secure applications may be provided via the SIMM cards, along with additional information, such as placing identifying information on the SIMM card in a non-hackable manner.

Expansion memory 374 may include, for example, flash memory and/or non-volatile RAM (NVRAM) memory. In one implementation, a computer program product is tangibly embodied in an information carrier. The computer program product contains instructions that, when executed, perform one or more methods, such as those described above. The information carrier is a computer- or machine-readable medium, such as memory 364, expansion memory 374, or a memory on processor 352, that may be received, for example, over transceiver 368 or external interface 362.

Mobile computing device 350 may communicate wirelessly through communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 368. In addition, short-range communication may occur, such as using a Bluetooth, WiFi, or other such transceiver (not shown). In addition, GPS (Global Positioning System) receiver module 370 may provide additional navigation-related and location-related wireless data to mobile computing device 350, which may be used as appropriate by applications running on mobile computing device 350.

Mobile computing device 350 may also communicate audibly using audio codec 360, which may receive spoken information from a user and convert the received spoken information to digital information. Audio codec 360 may likewise generate audible sound for a user, such as through a speaker, e.g., in a handset of mobile computing device 350. Such sound may include sound from voice telephone calls, may include recorded sound (e.g., voice messages, music files, etc.) and may also include sound generated by applications operating on mobile computing device 350.

Mobile computing device 350 may be implemented in a number of different forms, as shown in the figure. For example, mobile computing device 350 may be implemented as a cellular telephone 380. Mobile computing device 350 may also be implemented as part of a smart phone 382, personal digital assistant, or other similar mobile device.

Various implementations of the systems and techniques described herein can be realized in digital electronic circuitry, integrated circuitry, specially designed ASICs (application specific integrated circuits), computer hardware, firmware, software, and/or combinations thereof. These various implementations can include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) include machine instructions for a programmable processor, and can be implemented in a high-level procedural and/or object-oriented programming language, and/or in assembly/machine language. As used herein, the terms "machine-readable medium" and "computer-readable medium" refer to any apparatus and/or device (e.g., magnetic discs, optical disks, memory, Programmable Logic Devices ("PLDs")) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described herein can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described herein can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

Figure 4:
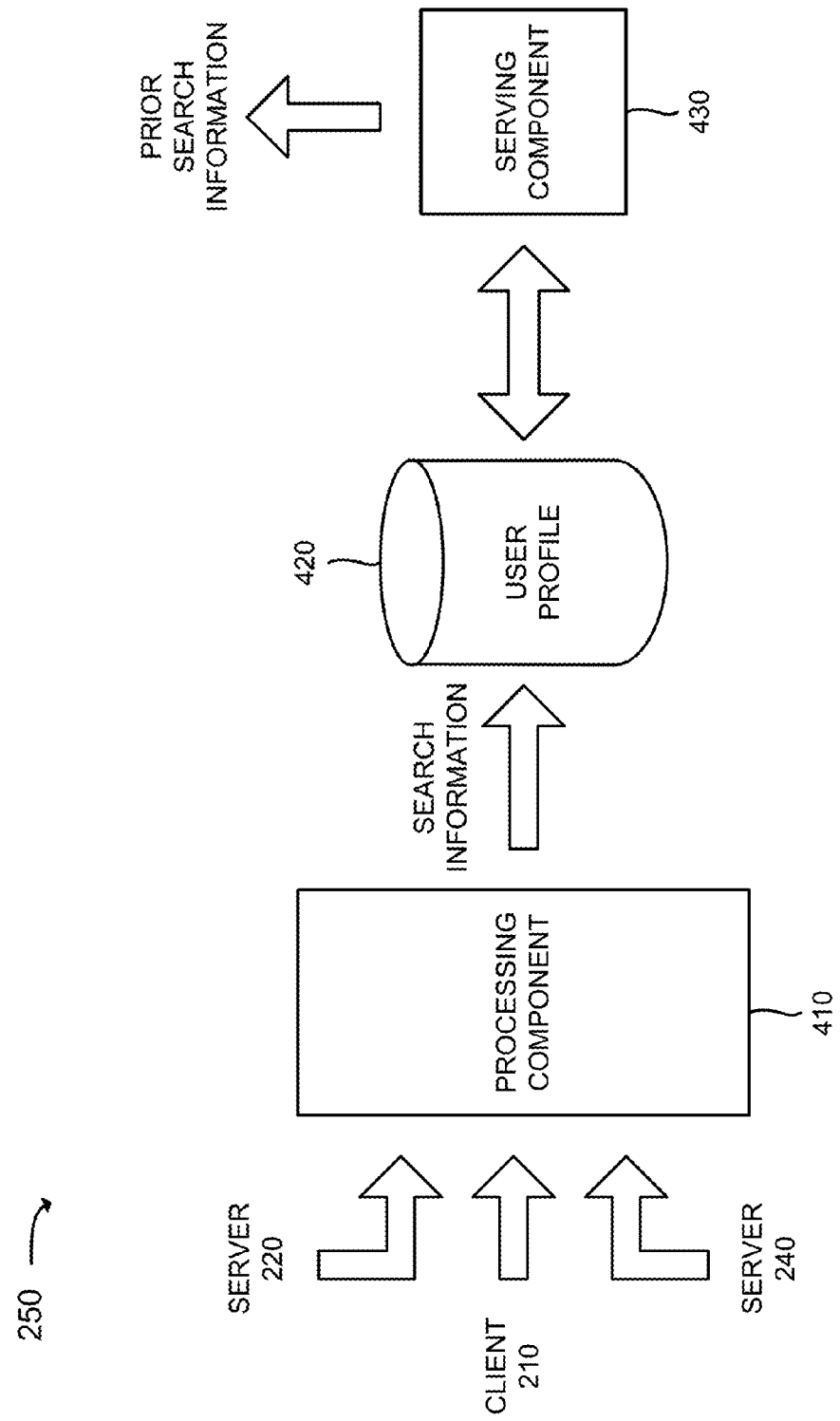
FIG. 4 is a diagram of example functional components of a user profile server of FIG. 2.

FIG. 4 is a diagram of example functional components of server 250. Each of the functional blocks, shown in FIG. 4, may be implemented by one or more of the components described with regard to FIG. 3. As shown in FIG. 4, server 250 may include processing component 410, user profile 420, and serving component 430. In another implementation, server 250 may include additional or fewer functional components than are illustrated in FIG. 4.

Processing component 410 may receive search information from client 210, server 220, and/or server 240. For example, client 210 may include a browser or a browser assistant, such as an add-on toolbar associated with the browser, which determines information regarding searches initiated by a user of client 210. For example, the user may provide permission that permits the browser or the browser assistant to determine information regarding the user's searches and provide the information to server 250. Processing component 410 may receive the information and provide the information, as search information, to user profile 420.

Server 220 or 240 may also determine information regarding a user's searches with the user's permission. For example, when a user initiates a search via search system 225 of server 220 or performs a search via server 240, server 220 or 240 may provide information, regarding the search, to server 250. Processing component 410 may receive the information and provide the information, as search information, to user profile 420.

User profile 420 may correspond to one or more memory devices, which may be co-located or remotely located, that store the search information provided by processing component 410. FIG. 5 is a diagram of an example data structure 500 that may be stored in user profile 420. As shown in FIG. 5, data structure 500 may include a number of records associated with different users. Each record may include a user identifier field 510 and a search history field 520. In another implementation, data structure 500 may include additional fields. For example, search history field 520 may include two or more fields or sub-fields.

User identifier field 510 may include a unique identifier for a user. For example, user identifier field 510 may include a character string that uniquely identifies a user. In one implementation, the character string may include user information, such as a username or an email address associated with a user, device information, such as a telephone number, an International Mobile Subscriber Identity (IMSI), or an Internet protocol (IP) address associated with client 210, or other information, such as a random string of characters.

Search history field 520 may include search information associated with the user identified by the character string provided in user identifier field 510. The search information may include various information regarding searches initiated by the user. For example, the search information may include information regarding a search query that the user provided. Additionally, or alternatively, the search information may include a timestamp that reflects a time associated with a search performed for the user. Additionally, or alternatively, the search information may include information regarding a device that the user used to provide the search query. Additionally, or alternatively, the search information may include information regarding search results that were provided in response to a search query provided by the user, such as what the search results were; the order of the search results; the scores of the search results; the categories with which the search results are associated; information regarding geographic locations associated with the search results; information regarding which search results the user selected; information regarding an amount of time that the user spent accessing a document associated with a selected search result; information regarding an amount of time that the user spent accessing the search results; and/or other information, regarding a search and/or search query, that may be useful in identifying an information item to provide to a user.

Returning to FIG. 4, serving component 430 may determine whether to provide prior search information for a particular user. For example, serving component 430 may analyze the search history information, associated with a particular user, and determine whether to provide information, regarding an object associated with the search history information, to a client 210 associated with the particular user.

Serving component 430 may use one or more contextual signals to select zero or more search results for which an information item may be provided. In one example implementation, serving component 430 may use information regarding a position of a previously-provided search result, in a list of search results, to determine whether to provide information regarding an object associated with that search result. For example, serving component 430 may select a search result with a position in the top A (A≥1, such as A≈1, 3, 5, or 10) places in a list of the search results. Using information regarding a position of a search result, as described above, may assure that the user is provided with information items associated with higher quality search results—i.e., search results that are located nearer the top of a list of search results than other search results in the list of search results.

In another example implementation, serving component 430 may use information regarding a score of a previously-provided search result to determine whether to provide information regarding an object associated with that search result. For example, serving component 430 may select a search result with a score that satisfies a threshold—e.g., exceeds the threshold. Using information regarding a score of a search result, as described above, may assure that the user is provided with information items associated with higher quality search results—i.e., search results that have quality and/or relevance scores that are higher than quality and/or relevance scores of other search results in a list of search results.

In yet another example implementation, serving component 430 may use information regarding a timestamp associated with a previously-provided search result to determine whether to provide information regarding an object associated with that search result. For example, serving component 430 may select a search result with a timestamp that indicates a time within a particular threshold of a current time, such as within the last 1 hour of the current time, the last 6 hours of the current time, the last 12 hours of the current time, the last 24 hours of the current time, the last 48 hours of the current time, etc. Using information regarding a timestamp associated with a search result, as described above, may assure that the user is provided with information items associated with fresher search results—i.e., search results that are more recent, in time, than other search results.

In a further example implementation, serving component 430 may use information regarding a category associated with a previously-provided search result to determine whether to provide information regarding an object associated with that search result. For example, serving component 430 may select a search result associated with a particular category in a list of categories. Certain categories of information may include information, which may be more meaningful to users, than other categories of information. These categories may be identified by a system administrator (e.g., associated with server 220, 240, or 250), or automatically identified, and included in a list of categories. Some examples of categories, for the list of categories, may include local (i.e., business listings or maps), product, news, web, video, and/or image categories. Using information regarding a category associated with a search result, as described above, may assure that the user is provided with information items associated with more meaningful search results—i.e., search results associated with categories that have been found to include more meaningful information than search results associated with other categories.

In another example implementation, serving component 430 may use information regarding whether a selection occurred in relation to a previously-provided search result to determine whether to provide information regarding an object associated with that search result. For example, serving component 430 may select a search result that has been selected by a user. Using information regarding whether a search result was selected, as described above, may assure that the user is provided with information items associated with search results in which the user has expressed an interest by, for example, selecting those search results, from one or more lists of search results, in the past.

In yet another example implementation, serving component 430 may use information regarding an amount of time that the user spent accessing a document, associated with a previously-provided search result, to determine whether to provide information regarding an object associated with that search result. For example, serving component 430 may select a search result associated with a document that the user spent at least a threshold amount of time accessing. Using information regarding an amount of time that the user spent accessing a document associated with a search result may assure that the user is provided with information items associated with search results in which the user has expressed an interest by, for example, spending at least the threshold amount of time accessing the associated document.

In another example implementation, serving component 430 may use information regarding an amount of time that the user spent accessing a list of search results, before providing a new search query or leaving the list of search results without selecting any of the search results in the list of search results, to determine whether to provide information regarding an object associated with one of the search results in the list of search results. Even in situations where the user selects none of the search results in the list of search results, it may be implied that the user has an interest in the search results if the user spends at least the threshold amount of time accessing the list of search results before either entering a new search query or navigating away from the list of search results. The opposite may also be true—i.e., in situations where the user selects none of the search results in the list of search results, it may be implied that the user has no interest in the search results if the user spends less than the threshold amount of time accessing the list of search results before either entering a new search query or navigating away from the list of search results. Thus, serving component 430 may select a search result, from a list of search results, when the user does not select any of the search results in the list of search results if the user spent at least a threshold amount of time accessing the list of search results. Using information regarding an amount of time that the user spent accessing the list of search results without selecting a search result may assure that the user is provided with information items associated with search results in which the user has an implied interest.

In yet another example implementation, serving component 430 may use information regarding a quantity of times that the user has submitted the same search query, whether the same search query has been submitted via different clients 210 of the user, and/or whether the user selected the same search result using different clients 210 of the user to determine whether to provide information regarding an object associated with one of the search results in the list of search results. A user's interest in the search results may be implied when the user submits the same search query multiple times within a particular time period, when the user submits the same search query via different clients 210, and/or when the user selects the same search result using different clients 210. Thus, serving component 430 may select a search result, from a list of search results relating to a search query, when the user submits that same search query multiple times within a given time period, when the user submits that search query via different clients 210, and/or when the user selects the search result using different clients 210. Using information regarding a quantity of times that the user submitted the same search query, information regarding submission of a query via different clients 210, and/or information regarding selection of a search result using different clients 210 may assure that the user is provided with information items associated with search results in which the user has an implied interest.

In a further example implementation, serving component 430 may use information regarding a geographic location, associated with a previously-provided search result, relative to a user's geographic location to determine whether to provide information regarding an object associated with that search result. For example, serving component 430 may select a search result that is associated with a geographic location within a particular distance of the user's geographic location. Using information regarding the geographic location of a search result relative to the user's geographic location, as described above, may assure that the user is provided with information items associated with search results in which the user may be interested—i.e., search results that have geographic locations near the user.

In another example implementation, serving component 430 may use a combination of two or more of the above-identified contextual signals, or yet other contextual signals, to determine whether to provide information regarding an object associated with a search result. It may be possible for each of the contextual signals, in the combination, to not contribute equally to the determination. For example, each of the contextual signals may be associated with a weighting factor that may control an amount that the contextual signal contributes to the determination. The weighting factor may include a value on a scale of zero to one, where a value of zero may indicate that the contextual signal does not contribute at all to the determination and a value of one may indicate that the contextual signal contributes fully to the determination.

Serving component 430 may operate in one or both of two modes, which may be configured by a system administrator or set by a user of a client 210. In the first mode, serving component 430 may operate to select zero or more information items when requested by, for example, client 210 or server 220 or 240. For example, in response to an indication from a client 210 that the client 210 has requested a certain web page via server 240, server 240 may contact server 250 to obtain zero or more information items. It may be possible that, based on the contextual signal(s) used by serving component 430, no search results are selected. In this case, serving component 430 may provide no information item to server 240. Alternatively, or additionally, client 210 may contact server 250 directly (without going through server 220 or 240) and, in response, serving component 430 may provide zero or more information items. For example, in one implementation, software executing on client 210 may request information items periodically, such as when client 210 is idle, charging, connected to a LAN, etc. A user, of client 210, may configure the software as to the conditions with which the software is permitted to request information items.

In the second mode, serving component 430 may periodically and automatically operate to select zero or more information items. For example, serving component 430 may operate based on a set schedule to identify zero or more information items. When serving component 430 identifies an information item, at a time indicated in the set schedule, serving component 430 may provide the information item to client 210 or to a server, such as server 220 or 240, which may provide the information item to client 210. In this second mode, client 210 may cache the information item to present at an appropriate time. The appropriate time may correspond to a time at which client 210 requests a certain web page from server 220 or 240. Alternatively, the appropriate time may correspond to never—i.e., the cached information item may never be presented if, for example, the information item expires. An expired information item may be deleted or marked for deletion.

There are at least two different factors that may be used to expire an information item: one is time-based and another is location-based. The time-based factor may be based on an amount of time that has transpired since a time associated with the information item. The time, associated with the information item, may be based on the timestamp associated with the search result corresponding to the information item. In one example, information items may be set to expire after a particular amount of time, such as after 1 hour, 6 hours, 12 hours, 24 hours, or 48 hours. The particular amount of time may be set by a system administrator or set by the user of client 210.

The location-based factor may be based on a distance between a geographic location, associated with the information item, and a current location of the user. The geographic location, associated with the information item, may be based on the geographic location associated with the search result corresponding to the information item. In one example, information items may be set to expire when a distance between the geographic location, associated with the information item, and the user's current location is greater than a particular distance, such as 5 kilometers, 10 kilometers, 25 kilometers, 50 kilometers, or 100 kilometers. The particular distance may be set by a system administrator or set by the user of client 210.

Figure 6:
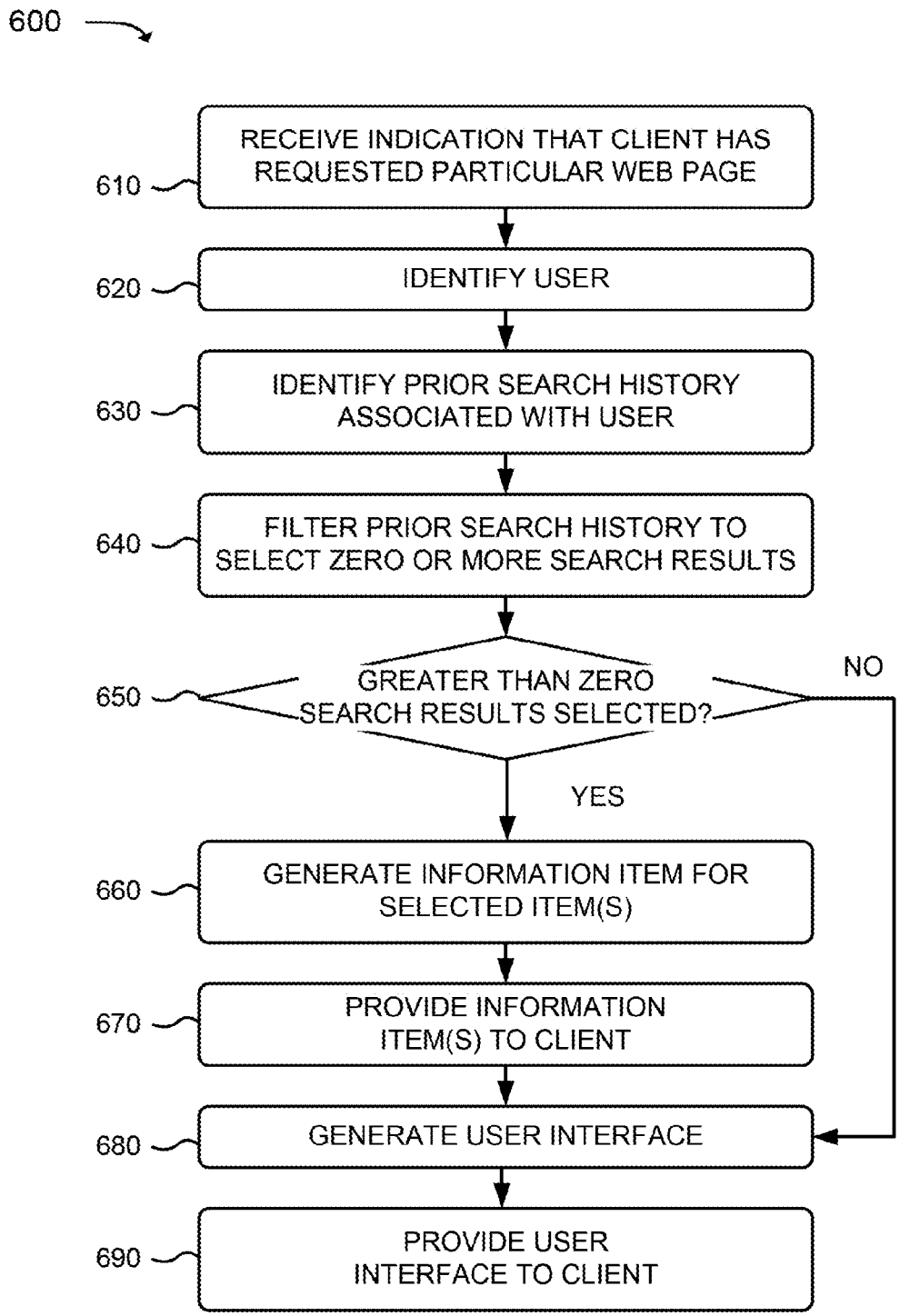
FIG. 6 is a flowchart of an example process for providing an item associated with a prior search history of a user.

FIG. 6 is a flowchart of an example process 600 for providing an item associated with a prior search history of a user. In one implementation, process 600 may be performed by server 240 and/or 250 (referred to hereinafter as "server 240/250"). In another implementation, process 600 may be performed by one or more other devices instead of, or possibly in conjunction with, server 240 and/or 250. For example, some or all of process 600 may be performed by client 210 and/or server 220.

Process 600 may include receiving an indication that client has requested a particular web page (block 610). For example, a user of a client 210 may open a browser on client 210 and request a particular web page via the browser. To request the particular web page, the user may select a bookmark, enter an address, such as a uniform resource locator (URL), or initiate a search for the particular the web page. In one implementation, the particular web page may correspond to a web site of an entity that owns or controls server 240/250. In response to the request, client 210 may generate a corresponding indication and provide the indication to server 240/250.

Process 600 may include identifying the user (block 620). For example, server 240/250 may determine whether the user can be identified based on user information and/or device information, which may include the types of information described above with regard to FIG. 5. In one implementation, server 240/250 may determine whether the user has logged into a service provided by server 240/250. If the user has logged in, server 240/250 may determine an identity of the user via the log-in operation. Alternatively, or additionally, server 240/250 may identify the user via an identifier, associated with client 210, which may be received from client 210. The identifier may include a telephone number associated with client 210, an IMSI associated with client 210, an IP address associated with client 210, or the like. If server 240/250 cannot identify the user, then process 600 may end (not shown in FIG. 6).

Process 600 may include identifying prior search history associated with the user (block 630). For example, server 240/250 may search user profile 420 to identify a record that is associated with the user. In one implementation, server 240/250 may use the information, used to identify the user, to locate a record in user profile 420. Server 240/250 may read the prior search history stored, for example, in search history field 520 of the record.

Process 600 may include filtering the prior search history to select zero or more search results (block 640). For example, server 240/250 may use a particular contextual signal, a combination of contextual signals, or a weighted combination of contextual signals, as described above, to determine whether any of the information, from the prior search history, should be provided to client 210. As described above, an example of a contextual signal, that may be used, includes: information regarding a position of a search result in a list of search results; information regarding a score of a search result; information regarding a timestamp associated with a search result; information regarding a category associated with a search result; information regarding whether a selection occurred in relation to a search result; information regarding an amount of time spent accessing a document associated with a search result; information regarding an amount of time spent accessing a list of search results; information regarding a quantity of times that a search query was submitted; information regarding whether the same search query has been submitted via different clients 210 of the user; information regarding whether the user selected the same search result using different clients 210 of the user; or information regarding a geographic location, associated with a search result, relative to the user's geographic location. Using the contextual signal(s), server 240/250 may select zero or more search results for which an information item is to be provided.

If greater than zero search results are selected (block 650), then process 600 may include generating an information item for each selected search result (block 660). For example, server 240/250 may obtain information regarding a selected search result, such as a document associated with the selected search result. From the obtained information, server 240/250 may generate an information item. An information item may correspond to a snippet of information associated with the search result. The information item may include, for example, a title, descriptive text, and/or one or more selectable objects. The selectable objects may permit additional information, associated with the search result, to be obtained and/or an action to be performed. The additional information may include a web page associated with the search result, a business listing associated with the search result, a map associated with the search result, directions to a geographic location associated with the search result, an image associated with the search result, a video associated with the search result, or the like. The action may include placing a voice call to a telephone number associated with the search result, sending a text message to an address or telephone number associated with the search result, sending an email to an email address associated with the search result, initiating a video conference to a party associated with the search result, sending a fax to a facsimile number associated with the search result, or the like.

Server 240/250 may format the information item for presentation on a display of a client 210. When a group of multiple information items are selected, server 240/250 may format the group of information items for concurrent or serial presentation on a display of client 210. For example, server 240/250 may format the group of information items as a horizontal or vertical list of information items.

Process 600 may include providing the information item(s) to client 210 (block 670). For example, server 240/250 may transmit the information item(s) to client 210 for storage in a memory of client 210. Client 210 may store the information item(s) until requested by the user or until the information item(s) expire. As explained above, an information item may be set to expire based on a time-based factor or a location-based factor. The time-based factor and/or the location-based factor may be set by a system administrator or a user of client 210. When an information item expires, client 210 may delete the information item from the memory or mark the information item for deletion.

Process 600 may include generating a user interface (block 680). For example, server 240/250 may generate a user interface, associated with the requested web page, that indicates whether zero search results were selected (block 650—NO) or greater than zero search results were selected (block 650—YES). For example, the user interface may include a visual indication that indicates a quantity of information items that are available. The visual indication may take one form when no information items are available and another form when there is at least one information item available. For example, when no information items are available, the visual indication may have a particular size or color that indicates that no information items are available, may not include a selectable object, and/or may include a message to indicate that no information items are available. When at least one information item is available, on the other hand, the visual indication may have a particular size or color that indicates that an information item is available, may include a selectable object, and/or may include a message to indicate a quantity of information items that are available. The selectable object, when selected, may cause the information item(s) to be presented on a display associated with client 210.

Process 600 may include providing the user interface to client 210 (block 690). For example, server 240/250 may transmit the user interface for presentation on a display associated with client 210.

While a particular quantity and order of blocks have been described with regard to process 600 of FIG. 6, the quantity and/or order of blocks may differ in other implementations. Some blocks may be performed in a different order or concurrently. For example, block 670 may be performed concurrently with or after block 680 or block 690.

Also, in some implementations, some or all of the communication between client 210 and a server, such as server 220, 240, or 250, may be performed in a secure manner. For example, the communication may occur using one or more known secure forms of communication, such as Hypertext Transfer Protocol Secure (HTTPS), encryption keys, etc.

Further, the user may be given the option to turn on and off the providing of information items. For example, the user may be permitted to opt in or opt out of this feature. The user's preference may be set in the user's profile and the user may be permitted to change the preference at any time.

Figure 7:
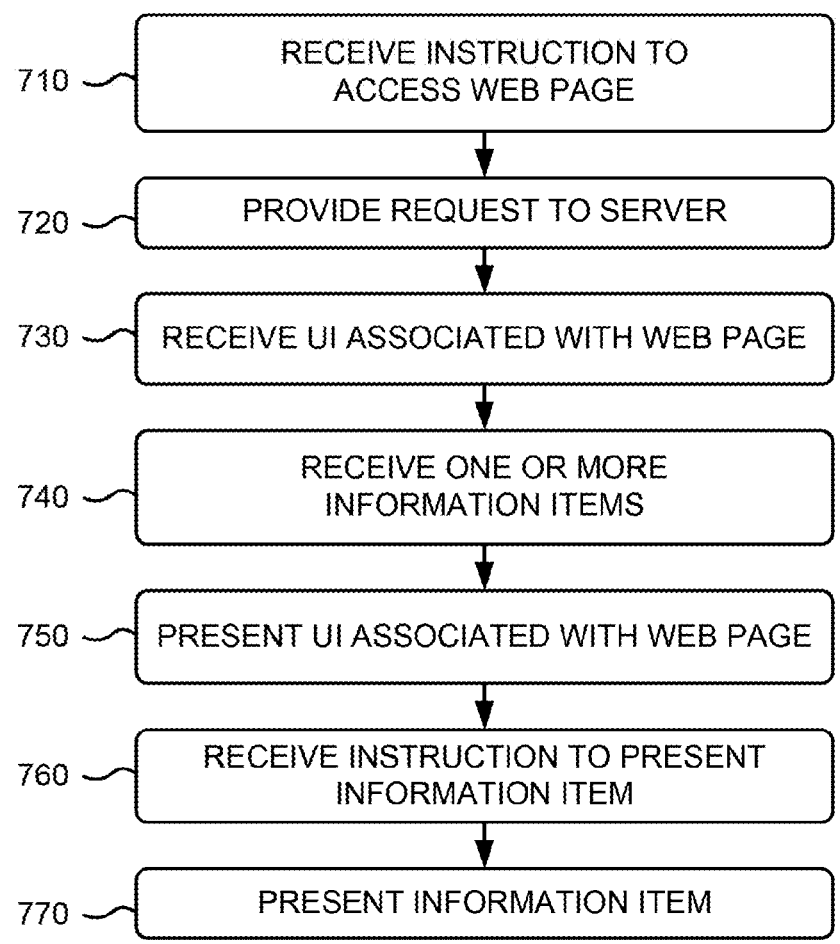
FIG. 7 is a flowchart of an example process for presenting an item associated with a prior search history of a user.

FIG. 7 is a flowchart of an example process 700 for presenting an item associated with a prior search history of a user. In one implementation, process 700 may be performed by client 210. In another implementation, process 700 may be performed by one or more other devices instead of, or possibly in conjunction with, client 210. For example, some or all of process 700 may be performed by server 220, 240, and/or 250.

Process 700 may include receiving an instruction to access a particular web page (block 710). For example, a user of a client 210 may open a browser on client 210 and request a particular web page via the browser. To request the particular web page, the user may select a bookmark, enter an address, such as a URL, or initiate a search for particular the web page. In one implementation, the particular web page may correspond to a web site of an entity that owns or controls server 220, 240, or 250.

Process 700 may include providing a request to a server (block 720). For example, in response to the instruction, client 210 may generate a request that indicates that the particular web page is requested. In one implementation, the request may additionally include information that identifies the user of client 210. In another implementation, client 210 may identify the user by providing user information or device information, which may include the types of information described above with regard to FIG. 5. Assume, for this example, that either the request includes information that identifies the user or that that user has been previously identified, such as via a prior log-in operation. Client 210 may send the request to a server, such as server 240 or 250.

Process 700 may include receiving a user interface (UI) associated with the particular web page (block 730). For example, server 240 or 250 may receive the request, from client 210, and may provide a user interface, associated with the particular web page, in response to the request. Client 210 may receive the user interface from server 240 or 250. In one implementation, the user interface may include information, such as the information described above with regard to block 680 of process 600 (FIG. 6).

Process 700 may include receiving one or more information items (block 740). For example, server 240 or 250 may also provide, to client 210, zero or more information items in response to the request. Assume, for this example, that server 240 or 250 provides one or more information items. Client 210 may receive the one or more information items from server 240 or 250. In one implementation, an information item may include information, such as the information described above with regard to block 660 of process 600 (FIG. 6).

Process 700 may include presenting the user interface associated with the particular web page (block 750). For example, client 210 may receive the user interface from server 240 or 250 and present the user interface on a display associated with client 210.

Process 700 may include receiving an instruction to present an information item (block 760) and presenting the information item (block 770). For example, the user may select a selectable object, corresponding to an information item, from the user interface associated with the particular web page. In response to the user's selection, client 210 may cause the information item to be presented on a display associated with client 210. In one implementation, the information item may be presented within an interactive overlay that is presented on top of the user interface. In another implementation, the information item may be presented to replace the user interface on a display associated with client 210.

The visual appearance of the information item may reflect the relevance of the information item in terms of time and/or location. For example, the information item may have a color, a size, or a format that indicates whether the information item is fresh or stale. Additionally, or alternatively, the information item may have a color, a size, or a format that indicates whether the information item is close or far. The definitions of fresh, stale, close, and/or far are based on thresholds, as described above, that may be set by a system administrator or a user of a client 210.

In one example implementation, a time-based score may be assigned to the information item based on one or more time-based thresholds. The time-based score may be used to determine whether the information item can be classified as fresh or stale. In another example implementation, a location-based score may be assigned to the information item based on one or more location-based thresholds. The location-based score may be used to determine whether the information item can be classified as fresh or stale. The time-based score or the location-based score may be used individually or in combination to determine the visual appearance of the information item. The visual appearance may inform the user of the relevance of the information item in terms of time or location.

While a particular quantity and order of blocks have been described with regard to process 700 of FIG. 7, the quantity and/or order of blocks may differ in other implementations. Some blocks may be performed in a different order or concurrently. For example, block 740 may be performed concurrently with or before block 730.

Figure 8:
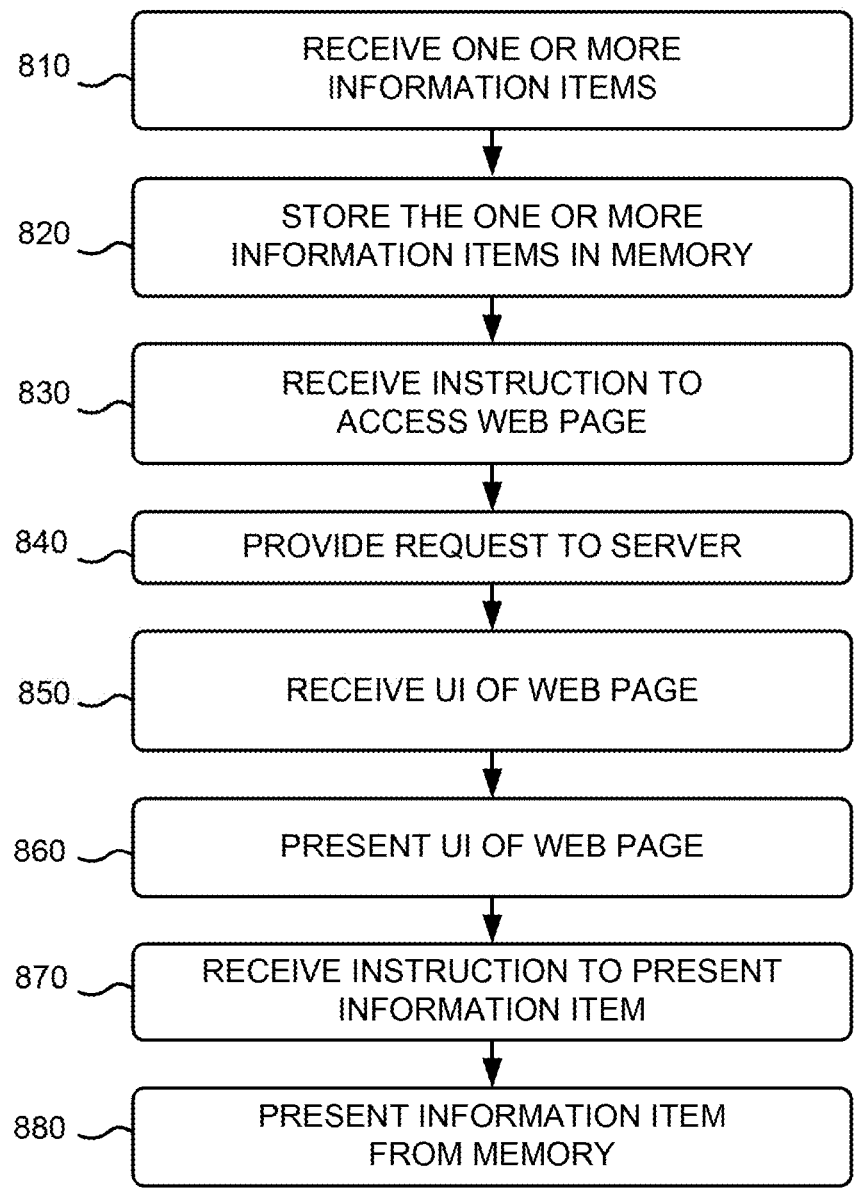
FIG. 8 is a flowchart of another example process for presenting an item associated with a prior search history of a user.

FIG. 8 is a flowchart of another example process 800 for presenting an item associated with a prior search history of a user. In one implementation, process 800 may be performed by client 210. In another implementation, process 800 may be performed by one or more other devices instead of, or possibly in conjunction with, client 210. For example, some or all of process 800 may be performed by server 220, 240, and/or 250.

Process 800 may include receiving one or more information items (block 810), and storing the one or more information items in memory (block 820). For example, server 240 or 250 may periodically provide, to client 210, one or more information items. As described above, server 240 or 250 may be configured to periodically push an information item to client 210. For example, server 240 or 250 may be configured to send any available information items, to client 210, according to a preset schedule. Alternatively, or additionally, client 210 may periodically request information items from server 240 or 250. For example, client 210 may be configured to request information items periodically, such as when client 210 is idle, charging, connected to a LAN, etc. Client 210 may receive the one or more information items from server 240 or 250 and may store the one or more information items in a memory, such as cache memory. In one implementation, an information item may include information, such as the information described above with regard to block 660 of process 600 (FIG. 6).

Process 800 may include receiving an instruction to access a particular web page (block 830). For example, a user of a client 210 may open a browser on client 210 and request a particular web page via the browser. To request the particular web page, the user may select a bookmark, enter an address, such as a uniform resource locator (URL), or initiate a search for particular the web page. In one implementation, the particular web page may correspond to a web site of an entity that owns or controls server 220, 240, or 250.

Process 800 may include providing a request to a server (block 840). For example, in response to the instruction, client 210 may generate a request that indicates that the particular web page is requested. In one implementation, the request may additionally include information that identifies the user of client 210. In another implementation, client 210 may identify the user by providing user information or device information, which may include the types of information described above with regard to FIG. 5. Assume, for this example, that either the request includes information that identifies the user or that the user has been previously identified, such as via a prior log-in operation. Client 210 may send the request to a server, such as server 240 or 250.

Process 800 may include receiving a user interface (UI) associated with the particular web page (block 850). For example, server 240 or 250 may receive the request, from client 210, and may provide a user interface, associated with the particular web page, in response to the request. Client 210 may receive the user interface from server 240 or 250. In one implementation, the user interface may include information, such as the information described above with regard to block 680 of process 600 (FIG. 6). In this case, however, the visual indication may reflect whether an information item, that was previously provided to client 210, has expired.

As described above, an information item may be set to expire based on a time-based factor or a location-based factor. The time-based factor and/or the location-based factor may be set by a system administrator or a user of client 210. When an information item expires, client 210 may delete the information item from the memory or mark the information item for deletion.

Process 800 may include presenting the user interface associated with the particular web page (block 860). For example, client 210 may receive the user interface from server 240 or 250 and present the user interface on a display associated with client 210.

Process 800 may include receiving an instruction to present an information item (block 870) and presenting the information item (block 880). For example, the user may select a selectable object, corresponding to an information item, from with the user interface associated with the particular web page. In response to the user's selection, client 210 may cause the information item to be presented on a display associated with client 210. In one implementation, the information item may be presented within an interactive overlay that is presented on top of the user interface. In another implementation, the information item may be presented to replace the user interface on a display associated with client 210.

As described above, the visual appearance of the information item may reflect the relevance of the information item in terms of time and/or location. For example, the information item may have a color, size, or format that indicates whether the information item is fresh or stale. Additionally, or alternatively, the information item may have a color, size, or format that indicates whether the information item is close or far. The definitions of fresh, stale, close, and/or far are based on thresholds that may be set by a system administrator or a user of a client 210.

While a particular quantity and order of blocks have been described with regard to process 800 of FIG. 8, the quantity and/or order of blocks may differ in other implementations. Some blocks may be performed in a different order or concurrently.

FIGS. 9-12 are diagrams illustrating various aspects of an example for providing information regarding a prior local search. Assume that a user uses her computer, at home, to perform a search for sports bar restaurants near San Francisco. Assume that the user is presented with a list of search results and the user selects three of the search results: one search result for "Fantastic Eatery," another search result for "Sports Bar," and another search result for "Bonfire Grill." Assume that the Fantastic Eatery result is the top-ranked result and is located in San Francisco, the Sports Bar result is the eighth result and is located in Oakland, and the Bonfire Grill result is the third result and is located in Mountain View.

As described above, search information regarding the user's search may be transmitted to a server, such as server 250. The search information may include various information, such as the search query that the user submitted—e.g., "sports bar restaurants san francisco;" a timestamp associated with the search—e.g., assume that the search occurred at 9:45 am on Nov. 11, 2011, which may result in a timestamp of 11112011:0945; information regarding the search results that were provided as relevant to the search query—e.g., this information may include information regarding at least the Fantastic Eatery, Sports Bar, and Bonfire Grill search results; information regarding a category associated with the search results—e.g., the Fantastic Eatery, Sports Bar, and Bonfire Grill search results may be associated with a local search category; information regarding whether a selection occurred in relation to a search result—e.g., the user selected the Fantastic Eatery, Sports Bar, and Bonfire Grill search results; and/or information regarding geographic locations associated with the search results—e.g., the Fantastic Eatery search result is associated with a geographic location in San Francisco, Calif., the Sports Bar search result is associated with a geographic location in Oakland, Calif., and the Bonfire Grill search result is associated with a geographic location in Mountain View, Calif.

Figure 9:
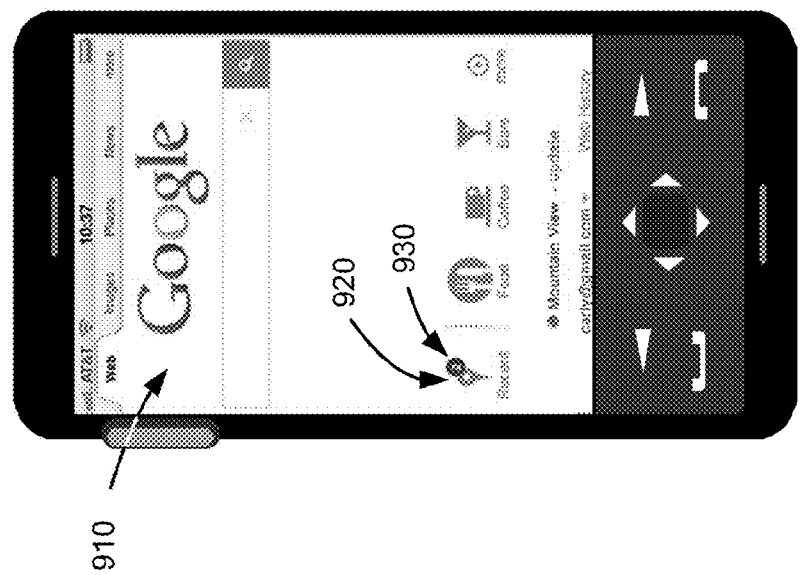

Assume that the user leaves home and takes, with her, her mobile device. Assume that the user travels to Mountain View, Calif. and, at 10:37 am on Nov. 11, 2011, uses her mobile device to access a web page associated with Google mobile search. As shown in FIG. 9, the user may be presented with a user interface 910 associated with the Google mobile search web page. User interface 910 may include a visual indication 920 relating to the user's prior search history. As shown in FIG. 9, visual indication 920 may include a notification 930 that indicates the quantity of information items that are available. In this example, notification 930 indicates that two information items are available. Assume, for this example, that the Sports Bar search result has been excluded, for among other reasons, because the distance between the user's current location in Mountain View is greater than a threshold distance from the geographic location of Oakland for the Sports Bar search result.

Figure 10:
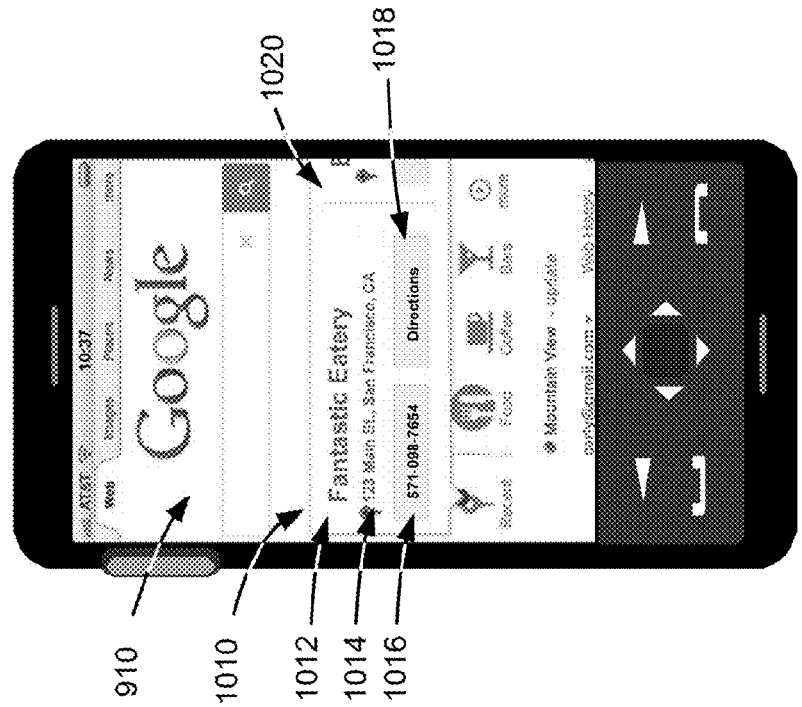
FIGS. 9-12 are diagrams illustrating various aspects of an example for providing information regarding a prior local search.

Assume that the user selects visual indication 920. As shown in FIG. 10, two information items 1010 and 1020 may be presented. Information items 1010 and 1020 may be presented as an overlay on top of user interface 910. As shown in FIG. 10, information items 1010 and 1020 may be presented as a horizontal, slideable list of information items. The user may move between information items 1010 and 1020 by sliding the information items 1010 and 1020 left or right with, for example, the user's finger.

In one implementation, information items 1010 and 1020 may be selectable by the user. For example, the user may select (e.g., double tap with the user's finger) an information item 1010 or 1020 to obtain additional information regarding the search result associated with the information item 1010 or 1020. The additional information may correspond to, for example, a web page associated with the search result. In this case, selection of an information item 1010 or 1020 may cause client 210 to navigate away from user interface 910 and present the web page.

As shown in FIG. 10, information item 1010 may include a title 1012, descriptive text 1014, and selectable objects 1016 and 1018. Title 1012 may include a title associated with the search result corresponding to information item 1010. As shown in FIG. 10, title 1012 may identify the name "Fantastic Eatery." Descriptive text 1014 may include text associated with the search result corresponding to information item 1010. The text may provide certain information regarding the search result and the information provided may vary depending on the category with which the search result is associated. As shown in FIG. 10, descriptive text 1014 may identify an address associated with Fantastic Eatery, which is shown in FIG. 10 as "123 Main St., San Francisco, Calif."

Selectable objects 1016 and 1018 may permit additional information to be obtained and/or an action to be performed. As shown in FIG. 10, selectable object 1016 may visually present a telephone number, shown as "571-098-7654." Selection of selectable object 1016 may cause a telephone call to be placed to the telephone number. As shown in FIG. 10, selectable object 1018 may visually present the text "Directions." Selection of selectable object 1018 may cause directions to be provided from the user's current geographic location to the geographic location of the Fantastic Eatery. There are several techniques that exist for determining the user's current geographic location, including a global positioning system (GPS) technique, a cell tower triangularization technique, a technique based on the IP address of the user's mobile device, etc.

Figure 11:
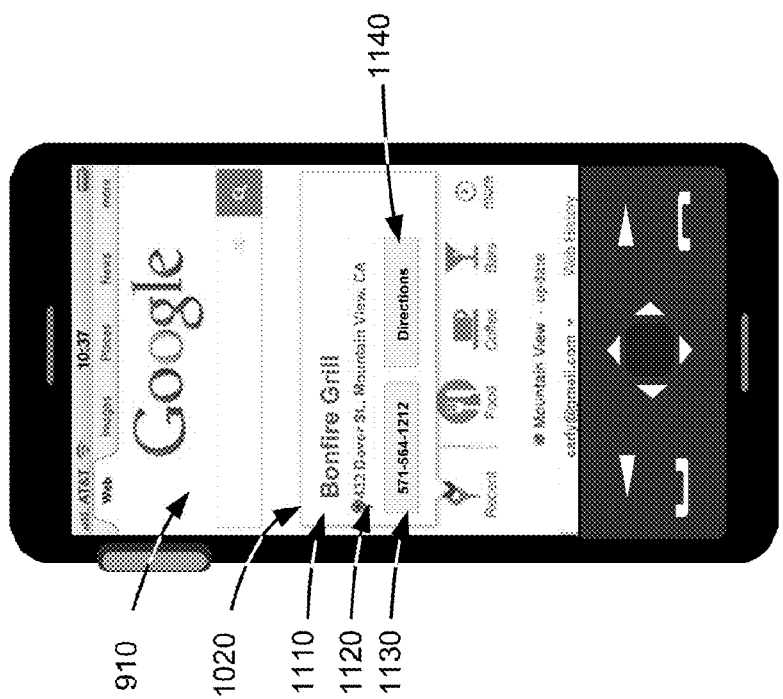

Assume that the user moves to information item 1020 by sliding information items 1010 and 1020 to the left using the user's finger. As shown in FIG. 11, information item 1020 is presented within an overlay on top of user interface 910. As further shown in FIG. 11, information 1020 may include information similar to information 1010, including a title 1110 (e.g., "Bonfire Grill"), descriptive text 1120 ("432 Dover St., Mountain View, Calif."), and selectable objects 1130 and 1140 ("571-564-1212" and "Directions," respectively).

Figure 12:
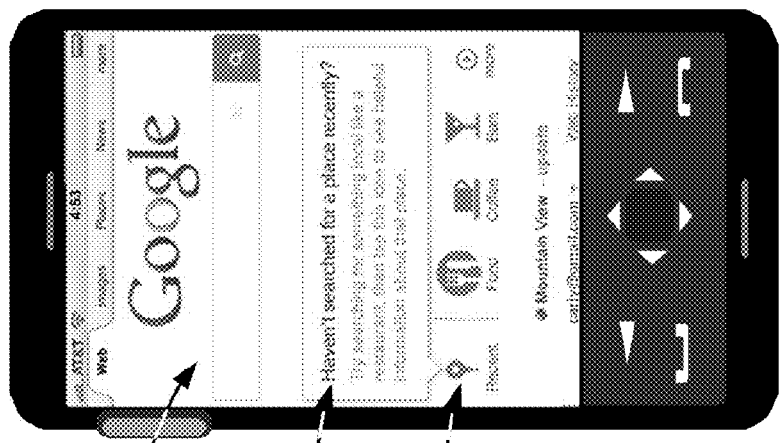

Assume that the next week, the user again travels to Mountain View, Calif. and, at 4:53 pm, the user uses her mobile device to access the web page associated with Google mobile search. Assume further that the user has not performed any searches since the search that the user performed on Nov. 11, 2011 and that all of the information items have expired. In this case, as shown in FIG. 12, the user may be presented with a user interface 1210 associated with the Google mobile search web page. User interface 1210 may include a visual indication 1220 relating to the user's prior search history. As shown in FIG. 12, visual indication 1220 may be a different size or color than visual indication 920 shown in FIG. 9 and, in contrast to visual indication 920, visual indication 1220 may be non-selectable since no information items are available. Rather, as shown in FIG. 12, a notification 1230 may be presented as an overlay on top of user interface 1210. Notification 1230 may serve to remind the user that prior search history information will be available if the user performs searches.

As illustrated in the example of FIGS. 9-12, the user may obtain information regarding a relevant prior search even though the user performed the prior search on another device. The user may obtain this information without having to recreate the search and, as a result, the user's search experience may be improved.

FIGS. 13 and 14 are diagrams illustrating various aspects of an example for providing information regarding a prior web search. As shown in FIG. 13, assume that a user uses her computer, at work, to perform a search to determine details of a particular flight. In this example, assume that the user has searches for the status of a Jetson flight 278, but mistakenly submits a search query for Jetson flight 279. Assume that Jetson flight 278 relates to a flight from San Francisco to Washington, D.C., and that Jetson flight 279 relates to a flight from Orlando to Detroit.

Assume that, in response to the search, the user is presented with a list of search results and that the top, highest scoring search result is associated with information relating to Jetson flight 279. Assume that the user immediately realizes that this is the incorrect flight and submits a subsequent search query for Jetson flight 278.

As described above, search information regarding the user's searches may be transmitted to a server, such as server 250. The search information may include various information, such as the search queries that the user submitted—e.g., "jetson flight status 279" and "jetson flight status 278;" a timestamp associated with the searches—e.g., assume that the first search occurred at 9:45 am on Nov. 11, 2011, which may result in a timestamp of 11112011:0945, and the second search occurred at 9:46 am on Nov. 11, 2011, which may result in a timestamp of 11112011:0946; information regarding the search results that were provided as relevant to the search query—e.g., assume that the top search result, for both searches, provides flight information; information regarding a category associated with the search results—e.g., assume that the top search results may be associated with a web category; information regarding whether a selection occurred in relation to a search result—e.g., assume that the user performed no selection from the list of search results for either search; or information regarding geographic locations, associated with the search results e.g., Jetson flight 279 is associated with the geographic locations of Orlando, Fla. and Detroit, Mich., and Jetson flight 278 is associated with the geographic locations of San Francisco, Calif. and Washington, D.C.

Assume that the user leaves home and takes, with her, her mobile device. Assume that the user travels to Mountain View, Calif. and, at 10:37 am on Nov. 11, 2011, uses her mobile device to access a web page associated with Google mobile search. As shown in FIG. 13, the user may be presented with a user interface 1310 associated with the Google mobile search web page. User interface 1310 may include a visual indication 1320 relating to the user's prior search history. As shown in FIG. 13, visual indication 1320 may include a notification 1330 that indicates the quantity of information items that are available. In this example, notification 1330 indicates that one information item is available. Assume, for this example, that the flight 279 search result has been excluded, for among other reasons, because the distance between the user's current location in Mountain View is greater than a threshold distance from the geographic locations of Orlando and Detroit for the flight 279 search result.

Assume that the user selects visual indication 1320. As shown in FIG. 14, information item 1410 may be presented. Information item 1410 may be presented as an overlay on top of user interface 1410. In one implementation, information item 1410 may be selectable by the user. For example, the user may select (e.g., double tap with the user's finger) an information item 1410 to obtain additional information regarding the search result associated with the information item 1410. The additional information may correspond to, for example, a web page associated with the search result, such as a web page, associated with Jetson, that may include detailed information regarding the particular Jetson flight. In this case, selection of information item 1410 may cause client 210 to navigate away from user interface 1310 and present the web page.

As shown in FIG. 14, information item 1410 may include a title 1412, descriptive text 1414, and selectable objects 1416 and 1418. Title 1412 may include a title associated with the search result corresponding to information item 1410. As shown in FIG. 14, title 1412 may identify the title "Jetson Airways Flight 278." Descriptive text 1414 may include text associated with the search result corresponding to information item 1410. The text may provide certain information regarding the search result and the information provided may vary depending on the category with which the search result is associated. As shown in FIG. 14, descriptive text 1414 may identify flight information regarding the Jetson flight, which is shown in FIG. 14 as "Departure: SFO 10:10 pm; Arrival: IAD 6:21 am."

Selectable objects 1416 and 1418 may permit additional information to be obtained and/or an action to be performed. As shown in FIG. 14, selectable object 1416 may visually present the text "Current Status." Selection of selectable object 1416 may cause information regarding the current status and/or location of the flight to be provided. The current status might include information, such as On Time, Delayed, or Canceled. The current status might also, or alternatively, include a map showing the current location of the flight. As also shown in FIG. 14, selectable object 1418 may visually present the text "Airport Parking" Selection of selectable object 1418 may cause information, regarding parking at the San Francisco airport, to be provided. Selectable object 1418 may lead to information about parking at San Francisco airport to be provided, rather than information about parking at Dulles airport, since the user is located closer to San Francisco airport than to Dulles airport. The parking information might include information, such as parking lots with available parking, parking rates, directions to parking lots, etc. The parking information might also, or alternatively, include a map showing the parking lots.

As illustrated in the example of FIGS. 13 and 14, the user may obtain information regarding a relevant prior search even though the user performed the prior search on another device. The user may obtain this information without having to recreate the search and, as a result, the user's search experience may be improved.

The foregoing description provides illustration and description, but is not intended to be exhaustive or to limit the implementations to the precise form disclosed. Modifications and variations are possible in light of the above disclosure or may be acquired from practice of the implementations.

Also, example user interfaces have been described with respect to FIGS. 9-14. In other implementations, the user interfaces may include additional pieces of information, fewer pieces of information, different pieces of information, or differently arranged pieces of information.

As used herein, the term component is intended to be broadly interpreted to refer to hardware or a combination of hardware and software, such as software executed by a processor.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computer-implemented method comprising:
   receiving a request from a user;
   determining a current context of the user;
   determining that a prior context in which the user previously submitted one or more search queries is characterized as similar to the current context;
   identifying one or more search results were each previously presented to the user in response to the one or more search queries that were previously submitted by the user in the prior context that is characterized as similar to the current context;
   selecting a subset of the one or more search results that (i) were each previously presented to the user in response to the one or more search queries that were previously submitted by the user in the prior context that is characterized as similar to the current context, and (ii) each have a relevance score that satisfies a predetermined relevance score threshold; and
   providing, in response to the request, a resource that references one or more entities associated with one or more of the search results of the subset.

2. The method of claim 1, wherein the request comprises a request for a resource that references one or more entities associated with one or more of the search results of the subset.

3. The method of claim 1, wherein the current context of the user is associated with a current time or the user's current location.

4. The method of claim 1, wherein the respective context that is characterized as similar to the current context is associated with a time the one or more search queries were previously submitted or a user's location when the one or more search queries were previously submitted.

5. The method of claim 1, wherein the relevance score is based on one or more of:
   information regarding whether a selection occurred in relation to the one or more search results, information regarding an amount of time spent accessing a document associated with of the one or more search results, information regarding an amount of time spent accessing a list of search results that includes the one or more search results, or information regarding a quantity of times that a search query, for which the of the one or more search results was identified as relevant, was submitted by the user.

6. The method of claim 1, wherein the relevance score is based on one or more of:
   information regarding position of the one or more search results in a list of search results, information regarding scores of the one or more search results, information regarding a category associated with the one or more search results, information whether a same search query, for which one or more search results was identified as relevant, has been submitted via different devices of the user, or information whether the user selected a particular search result using different devices of the user.

7. The method of claim 1, wherein providing the resource comprises:
   setting a visual appearance of the resource, wherein the visual appearance reflects a difference in time between when the time when one or more of the search results were presented and a current time.

8. The method of claim 1, wherein determining a current context of the user is based on one or more obtained contextual signals.

9. The method of claim 1, wherein determining a current context of the user comprises determining that the user is using a first device, and
   determining that one or more search results were previously presented to the user in response to one or more search queries that were previously submitted by the user, comprises determining that the one or more search results were previously presented to the user when the user was using a second device.

10. The method of claim 9, wherein the first device comprises a mobile computing device and the second device comprises a desktop computer.

11. The method of claim 1, wherein determining that a prior context in which the user previously submitted one or more search queries is characterized as similar to the current context comprises:
    determining that the one or more search queries that were previously submitted were submitted within a predetermined period of time to a current time in which the request was received, or that the one or more search queries each refer to a geographic location that is within a predetermined distance of the user's current geographic location when the request was received.

12. A system comprising:
    one or more computers and one or more storage devices storing instructions that are operable, when executed by the one or more computers, to cause the one or more computers to perform operations comprising:
    receiving a request from a user;
    determining a current context of the user;
    determining that a prior context in which the user previously submitted one or more search queries is characterized as similar to the current context;
    identifying one or more search results were each previously presented to the user in response to the one or more search queries that were previously submitted by the user in the prior context that is characterized as similar to the current context;
    selecting a subset of the one or more search results that (i) were each previously presented to the user in response to the one or more search queries that were previously submitted by the user in the prior context that is characterized as similar to the current context, and (ii) each have a relevance score that satisfies a predetermined relevance score threshold; and
    providing, in response to the request, a resource that references one or more entities associated with one or more of the search results of the subset.

13. The system of claim 12, wherein the request comprises a request for a resource that references one or more entities associated with one or more of the search results of the subset.

14. The system of claim 12, wherein the current context of the user is associated with a current time or the user's current location.

15. The system of claim 12, wherein the respective context that is characterized as similar to the current context is associated with a time the one or more search queries were previously submitted or a user's location when the one or more search queries were previously submitted.

16. The system of claim 12, wherein the relevance score is based on one or more of:
information regarding whether a selection occurred in relation to the one or more search results, information regarding an amount of time spent accessing a document associated with of the one or more search results, information regarding an amount of time spent accessing a list of search results that includes the one or more search results, or information regarding a quantity of times that a search query, for which the of the one or more search results was identified as relevant, was submitted by the user.

17. The system of claim 12, wherein the relevance score is based on one or more of:
information regarding position of the one or more search results in a list of search results, information regarding scores of the one or more search results, information regarding a category associated with the one or more search results, information whether a same search query, for which one or more search results was identified as relevant, has been submitted via different devices of the user, or information whether the user selected a particular search result using different devices of the user.

18. The system of claim 12, wherein providing the resource comprises:
setting a visual appearance of the resource, wherein the visual appearance reflects a difference in time between when the time when one or more of the search results were presented and a current time.

19. The system of claim 12, wherein determining a current context of the user is based on one or more obtained contextual signals.

20. A non-transitory computer-readable medium storing software comprising instructions executable by one or more computers which, upon such execution, cause the one or more computers to perform operations comprising:
receiving a request from a user;
determining a current context of the user;
determining that a prior context in which the user previously submitted one or more search queries is characterized as similar to the current context;
identifying one or more search results were each previously presented to the user in response to the one or more search queries that were previously submitted by the user in the prior context that is characterized as similar to the current context;
selecting a subset of the one or more search results that (i) were each previously presented to the user in response to the one or more search queries that were previously submitted by the user in the prior context that is characterized as similar to the current context, and (ii) each have a relevance score that satisfies a predetermined relevance score threshold; and
providing, in response to the request, a resource that references one or more entities associated with one or more of the search results of the subset.

* * * * *